US011231554B2

(12) United States Patent
Lam (10) Patent No.: US 11,231,554 B2
(45) Date of Patent: Jan. 25, 2022

(54) DEVICES AND METHODS FOR PROTECTING IR-VIS SENSORS FROM ELECTROMAGNETIC INTERFERENCE

(71) Applicant: The Boeing Company, Chicago, IL (US)

(72) Inventor: Tai Anh Lam, Renton, WA (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 16/716,340

(22) Filed: Dec. 16, 2019

(65) Prior Publication Data
US 2021/0364714 A1    Nov. 25, 2021

(51) Int. Cl.
*G02B 6/12*       (2006.01)
*G02B 6/14*       (2006.01)
*G02B 6/38*       (2006.01)

(52) U.S. Cl.
CPC .................. *G02B 6/3891* (2013.01)

(58) Field of Classification Search
CPC ............... G02B 6/00; G02B 6/14; G02B 6/12
USPC ............................................................. 385/2
See application file for complete search history.

(56) References Cited

U.S. PATENT DOCUMENTS

| 5,276,455 | A | * | 1/1994 | Fitzsimmons | ..... H01Q 21/0087 |
| | | | | | 342/368 |
| 5,488,380 | A | * | 1/1996 | Harvey | .............. H01Q 21/0025 |
| | | | | | 333/248 |
| 9,910,200 | B1 | | 3/2018 | Sechrist et al. | |
| 2001/0019479 | A1 | * | 9/2001 | Nakabayashi | ....... G02B 6/0055 |
| | | | | | 362/615 |
| 2005/0238278 | A1 | * | 10/2005 | Nakashiba | ......... G02B 6/12004 |
| | | | | | 385/14 |
| 2006/0119853 | A1 | * | 6/2006 | Baumberg | ........... G01N 21/658 |
| | | | | | 356/445 |
| 2010/0175749 | A1 | * | 7/2010 | Tsutsumi | ........ H01L 31/022433 |
| | | | | | 136/256 |
| 2011/0195360 | A1 | * | 8/2011 | Flemming | ............... C03C 15/00 |
| | | | | | 430/314 |
| 2015/0247960 | A1 | * | 9/2015 | Kildishev | .............. G02B 1/005 |
| | | | | | 359/258 |

(Continued)

OTHER PUBLICATIONS

Kolodziejska et al., "Research Update: Enabling Ultra-thin Lightweight Structures: Microsandwich Structures with Microlattice Cores," APL Mater. 3, 050701 (2015), pp. 1-8.

(Continued)

*Primary Examiner* — Kaveh C Kianni
(74) *Attorney, Agent, or Firm* — Haynes and Boone, LLP (57) ABSTRACT

Devices and methods for protecting electro-optical instruments includes a transparent substrate and a conductive film layer on the substrate. The film layer may be perforated with an array of holes and may be configured to attenuate RF/microwave electromagnetic radiation. The devices may include a plurality of optical waveguides having a first end and a second end, wherein the first end of each optical waveguide is disposed over the substrate and passes through a respective hole of the array of holes such that each hole includes at least one optical waveguide. The waveguide may be configured to capture incident light from the second end and guide the incident light to the first end through the hole.

20 Claims, 8 Drawing Sheets

(56) References Cited

U.S. PATENT DOCUMENTS

2015/0323730 A1* 11/2015 Lu ................... B29D 11/00663
427/510
2019/0288132 A1* 9/2019 Wang ................. H01L 31/0232

OTHER PUBLICATIONS

Hosein et al., "Waveguide Encoded Lattices (WELs): Slim Polymer Films with Panoramic Fields of View (FOV) and Multiple Imaging Functionality," Advanced Functional Materials (2017), 1702242, pp. 1-11.

* cited by examiner

DEVICES AND METHODS FOR PROTECTING IR-VIS SENSORS FROM ELECTROMAGNETIC INTERFERENCE

TECHNICAL FIELD

The present application generally relates to shielding electro-optical instruments from RF/microwave electromagnetic radiation while maintaining optical transparency. More particularly, it relates to devices and methods for protecting IR-VIS sensors from electromagnetic interferences.

BACKGROUND

Electro-optical instruments such as infrared (IR) and visible range (VIS) sensors are generally susceptible to electromagnetic interferences (EMI). Such electronic devices may be located or mounted in a sensor pod of an aircraft and are often exposed to environments where EMI is prevalent. Consequently, the sensors can be damaged by high power microwave, electromagnetic pulses, and/or radar. To mitigate EMI, the sensor pod housing (or wall) may be metallic and serve as a Faraday cage to protect the sensor from EMI. However, sensor pods usually have a window that is optically transmissive to infrared and visible range wavelengths.

Although such transmissive window may be treated to reflect or absorb wavelengths in the radio frequency (RF) and/or microwave ranges, such conventional solutions have several shortcomings. One conventional technique applies a metallic coating on a window of an aircraft, such as a canopy of a fighter jet. With such techniques, the thickness of the metallic layer must be kept sufficiently thin to allow IR-VIS light to pass through. However, due to skin depth effects, the thin metallic layer is inadequate for stopping lower frequency RF, high power microwave, and/or electromagnetic pulses. Another conventional technique applies a transparent conductor such as indium tin oxide (ITO) on the window. However, ITO has lower conductivity and electron density than metal, thus resulting in reduced attenuation power against RF, high power microwave, and/or electromagnetic pulses. While the attenuation power can be improved by increasing the thickness of the ITO layer, it is sometimes impractical because it increases attenuation against IR-VIS wavelengths. Therefore, there is a need for an improved approach for attenuating RF/microwave wavelengths while maintaining optical transparency in the infrared and visible range wavelengths.

SUMMARY

According to an embodiment, a device is described that includes: a transparent substrate; a conductive film layer on the substrate, wherein the film layer is perforated with an array of holes and configured to attenuate RF/microwave electromagnetic radiation; a plurality of optical waveguides, each optical waveguide having a first end and a second end, wherein the first end of each optical waveguide is disposed over the substrate and passes through a respective hole of the array of holes such that each hole includes at least one optical waveguide, and wherein the waveguide is configured to capture incident light from the second end and guide the incident light to the first end through the hole.

According to another embodiment, the second ends of the plurality of waveguides may be adjacent and abut each other to form a planar optical surface. The planar optical surface may form a light capturing surface, configured to capture the incident light and guide the light to the first end. The array of holes may be arranged in one of a lattice pattern, a rectangular pattern, or a hexagonal pattern. The optical waveguide may be tapered such that a diameter of the second end of the optical waveguide is larger than a diameter of the first end of the optical waveguide, and the first end of the waveguide is a truncated taper. The hole may be a square hole, and the tapered optical waveguide may be a truncated pyramid taper. A diameter of each of the holes may be smaller than a wavelength of the RF/microwave electromagnetic radiation. The plurality of optical waveguides may include micro-optical structures fabricated by lithography. The conductive film layer may be a conductive material selected from the group consisting of: copper, gold, silver, and aluminum, and fabricated using lithography, sputtering, or electroplating.

According to another embodiment, an electro-optical instrument that includes a protective shield is described. The instrument including the device may be configured to attenuate RF/microwave electromagnetic radiation and concurrently transmit incident visible or infrared light. The instrument may be a visible or infrared light camera.

According to another embodiment, an aircraft cockpit window including a protective shield is described. The protective shield may include the device configured to attenuate RF/microwave electromagnetic radiation from an exterior of the cockpit and concurrently transmit incident optical light from an exterior of the cockpit to an interior of the cockpit.

According to another embodiment, a method for protecting an optical device from an incident RF/microwave electromagnetic radiation using the device is described. The method may include: receiving the incident RF/microwave electromagnetic radiation; attenuating the RF/microwave electromagnetic radiation using the conductive thin film layer; and transmitting concurrently, the incident light to the optical device.

According to another embodiment, a method for forming an electromagnetically protective shield for an optical device is described. The method may include: providing a transparent substrate; providing a conductive film layer on the substrate, wherein the film layer may be perforated with an array of holes and configured to attenuate the incident RF/microwave electromagnetic radiation; and providing a plurality of optical waveguides, each optical waveguide having a first end and a second end, wherein the first end of each optical waveguide may be disposed over the substrate and passes through a respective hole of the array of holes such that each hole comprises at least one optical waveguide, and wherein the waveguide is configured to capture incident light from the second end and guide the incident light to the first end through the hole.

The method may include providing the substrate including the conductive film layer and the plurality of optical waveguides between the optical device and an incident RF/microwave electromagnetic radiation. The waveguides of the plurality of optical waveguides may be bundled together to form a planar optically transparent surface at the second end of the waveguides. The optical waveguide may be tapered such that a diameter of the second end of the optical waveguide is larger than a diameter of the first end of the optical waveguide, and the first end of the waveguide is a truncated taper.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Electro-optical instruments or electro-optical sensors such as, for example, infrared (IR) sensors and visible range (VIS) sensors, are often susceptible to interferences and/or damages from EMI. For example, a tactical aircraft may have mounted underneath the fuselage a sensor pod with an electro-optical sensor inside. As the aircraft flies past an airport or an aircraft carrier that transmits radar signals (e.g., rotating radar), high power microwave or electromagnetic pulses from a land-based or shipboard radar may sweep across the aircraft, thus potentially interfering with and/or damaging the electronic components of the electro-optical sensor. A conventional solution may include applying the concept of a Faraday cage and contain the electro-optical sensor in a metallic enclosure such as a sensor pod to attenuate or block the EMI, but a complete enclosure would also prevent the necessary infrared waves or visible range waves from transmitting through the enclosure, thus rendering useless the electro-optical sensor. An optically transparent surface or enclosure is desirable to allow the infrared or visible range waves to pass through the surface so that the electro-optical sensor (e.g., an IR camera or VIS camera) can be operated.

Various devices and techniques are provided herein the present disclosure to protect an electro-optical sensor from EMI while maintaining maximum transmissivity of infrared and visible range waves. In some embodiments, up to about 100 dB of electromagnetic radio frequency (RF) or microwave radiation may be attenuated while allowing 100% (or substantially all) of the infrared or visible range waves to be transmitted. In this manner, the electro-optical sensor may be protected from EMI without affecting the functionality of the electro-optical sensor to detect and receive optical transmission of the infrared or visible waves.

In some embodiments, a similar technique may be used on a window of an aircraft cockpit or on a canopy of a tactical aircraft, such as a fighter jet. In such environments, it may be desirable to protect the pilot and/or the onboard avionics from RF/microwave radiation, for example, from enemy fire-control radar or electronic countermeasures, while still allowing the pilot to visually see outward from the window or the canopy.

Figure 1A:
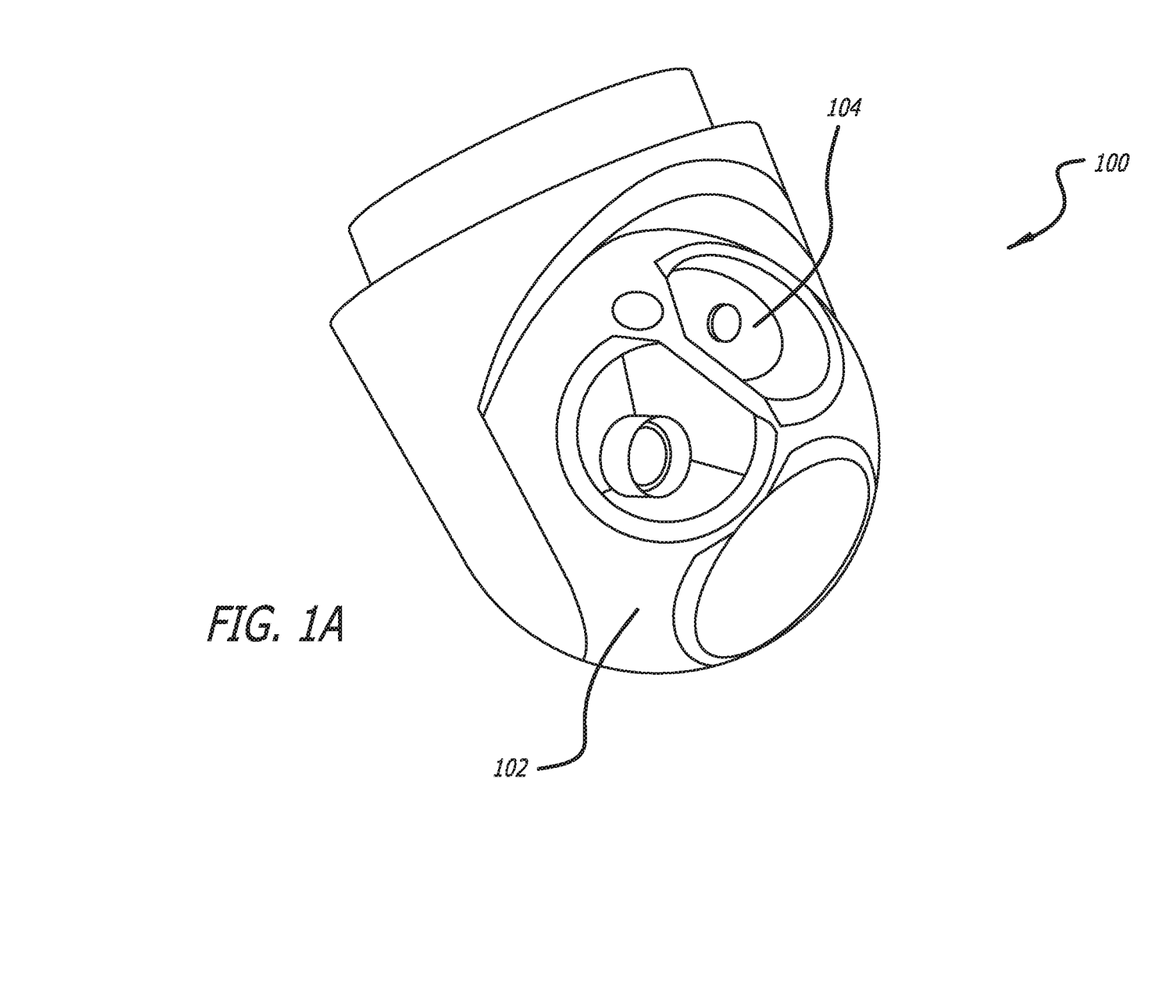
FIG. 1A illustrates an example of a sensor pod containing an electro-optical instrument including a transparent window through which the electro-optical instrument operates.

FIG. 1A illustrates an example of a sensor pod that contains an electro-optical sensor. The sensor pod 100 may be mounted underneath the fuselage or the wings of a manned or unmanned aircraft, and may serve to protect the sensor from the elements, e.g., rain or dust, as well as protect the sensor from EMI, according to the embodiments of the present disclosure. The sensor pod 100 may have a dome-like shape and the walls 102 of the sensor pod 100 may be made of a metallic material 102 to attenuate any EMI from external sources. Additionally, the sensor pod 100 may also include a transparent window 104 to allow the sensor to capture IR-VIS waves. The embodiments of the present disclosure provide techniques to maintain the optical transparency by the window while still protecting the sensor from EMI.

Figure 1B:
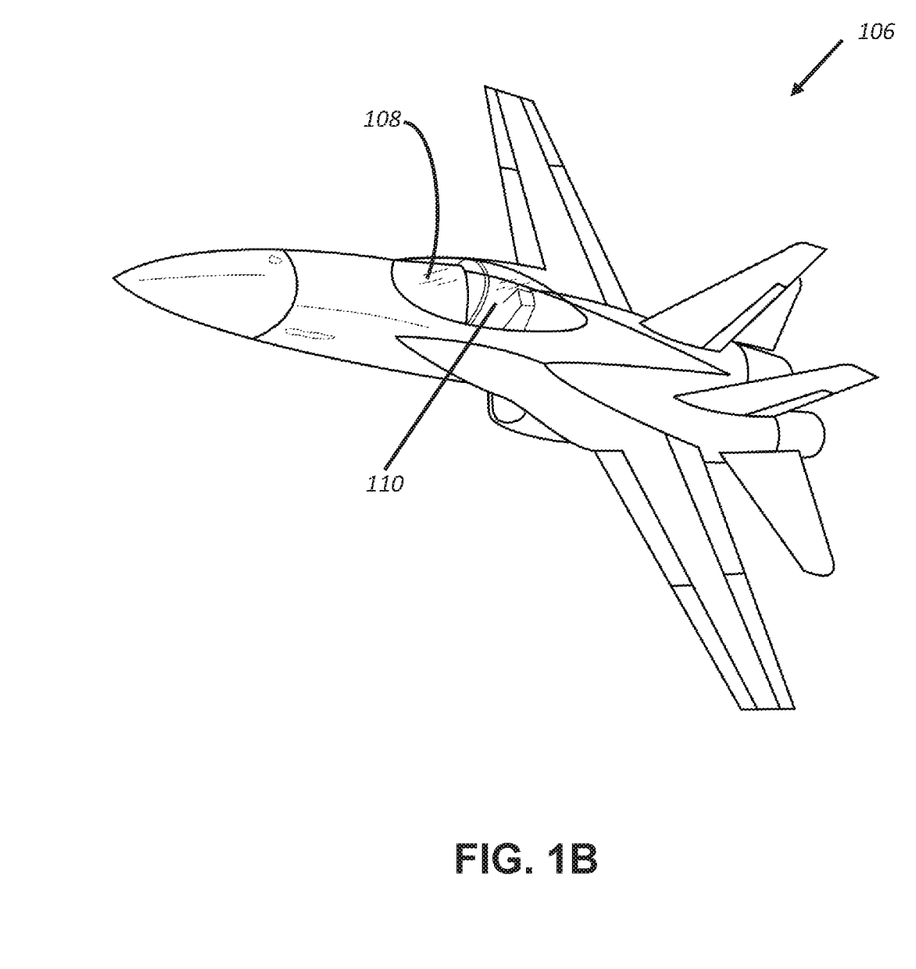
FIG. 1B illustrates an example aircraft that includes a canopy over the cockpit region.

FIG. 1B illustrates an example of an aircraft 106 (e.g., a tactical jet) that includes a canopy over the cockpit 110 region of the aircraft 106. The embodiments of the present disclosure also provide techniques to protect the pilot and/or the avionics inside of the cockpit from EMI while maintaining IR or VIS optical transparency through the canopy 108.

Figure 2:
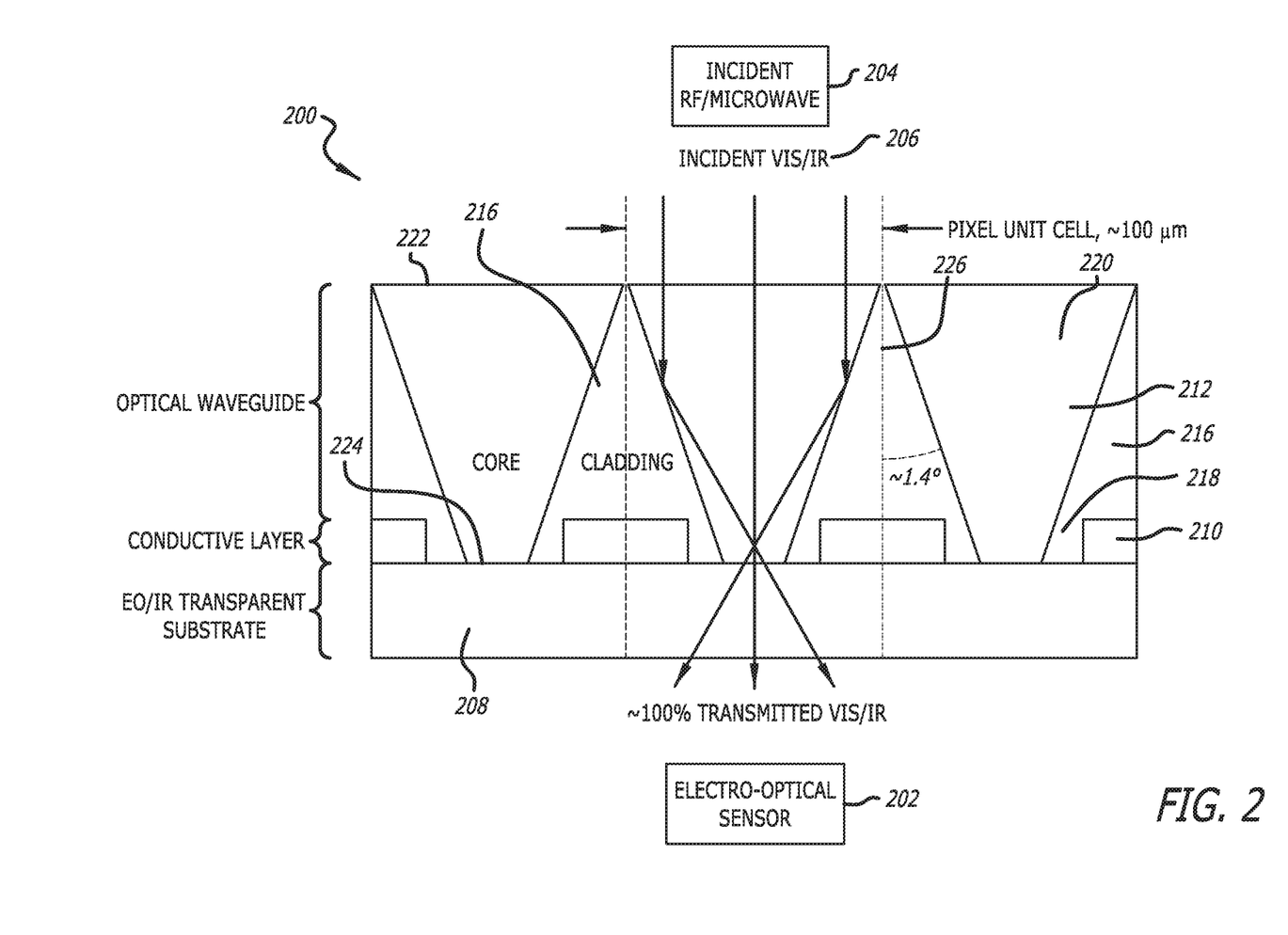
FIG. 2 illustrates a cross-sectional view of an RF/microwave electromagnetic radiation shield, according to an embodiment of the present disclosure.

FIG. 2 illustrates a cross-sectional view of an example shield 200 according to various embodiments of the present disclosure. As provided, the shield 200 is configured to attenuate or block up to about 100 dB of wideband (e.g., about 100 MHz-100 Ghz) incident RF/microwave electromagnetic radiation 204 from penetrating through the shield 200 while still allowing substantially all (e.g., about 100%) IR or VIS waves to pass through the shield 200 with little to no loss. Thus, an electro-optical sensor 202 that is located at the other side of the shield 200 can remain functional and detect or sense the IR or VIS waves while still being protected from the incident RF/microwave radiation 204. According to an embodiment, the shield 200 includes an electro-optically transparent substrate 208 with a conductive film layer 210 disposed over the substrate 208. The substrate 208 may be a transparent non-conductive element such as, for example, sapphire, zinc selenide, or glass, and acts as a base layer for the other elements that may be layered over the substrate 208. In some embodiments, the substrate 208 may be about 500 μm thin. A conductive film layer 210, perforated with a plurality of holes 218 may be disposed on the substrate and a plurality of optical waveguides 212 may be fabricated through the hole 218 and on the substrate 208 such that each hole 218 has an optical waveguide 212 (e.g., at least one optical waveguide 212) that passes through the hole 218. As illustrated in FIG. 2, the optical waveguide 212 is tapered and truncated at one end (e.g., first end 224), such that the truncated portion of the first end 224 is on the substrate 208. In some embodiments, a diameter of the first end 224 of the tapered optical waveguide 212 is smaller than a diameter of the second end 222 of the optical waveguide 212 facing away from the substrate 208 (e.g., the opposite end). Accordingly, the first ends 222 of the optical waveguides 212 are disposed on the substrate 208 and the second ends 222 of the optical waveguides 212 are directed in a direction away from the substrate 208. In some embodiments, the plurality of the second ends 222 of the optical waveguides 212 are formed adjacent each other such that they form a bundle and abut each other. In some embodiments, the second end 222 portions of the optical waveguides 212 may even slightly overlap each other. In this manner, the bundled second end 222 portions of the optical waveguides 212 form a planar optical surface that is configured to receive optical light (e.g., IR or VIS waves) and allow the light to propagate through the optical waveguide 212 from the second end 222 to the first end 224.

In some embodiments, the conductive film layer 210 may be fabricated on the substrate using microfabrication clean room technology such as sputtering or electroplating, and the holes 218 may be formed using lithography or etching. The conductive film layer 210 may be about 10 μm thin, and may be made of a conductive metallic element, such as, for example, copper, gold, silver, and aluminum. Other non-metallic elements with similar conductive properties such as, for example, indium-tin-oxide (ITO) may be used. Furthermore, conductive film layers 210 that are thicker or thinner than 10 μm may also be envisaged. Once the perforated conductive film layer 210 is formed on the substrate, the tapered optical waveguides 212 may be fabricated, also using clean room technology such as, for example, according to techniques provided in: J. A. Kolodziejska, C. S. Roper, S. S. Yang, W. B. Carter, and A. J. Jacobsen, "Research Update: Enabling ultra-thin lightweight structures: Microsandwich structures with microlattice cores," APL Mater. 3, 050701 (2015); Ian D. Hosein, Hao Lin, Matthew R. Ponte, Dinesh K. Basker, Michael A. Brook, and Kalaichelvi Saravanamuttu, "Waveguide Encoded Lattices (WELs): Slim Polymer Films with Panoramic Fields of View (FOV) and Multiple Imaging Functionality," Adv. Funct. Mater. 2017, 1702242; and U.S. Pat. No. 9,910,200, all of which are incorporated herein by reference in their entirety.

Figure 3:
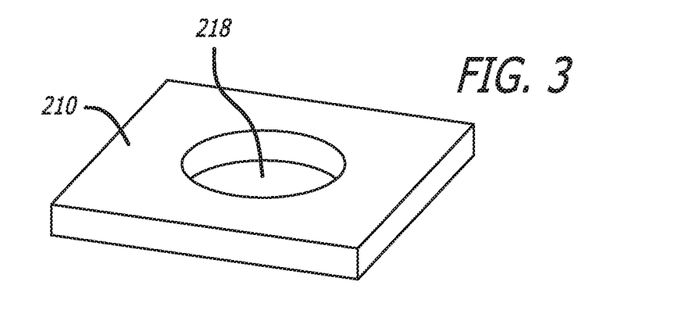
FIG. 3 illustrates a perspective view of a unit cell of a conductive film layer, according to an embodiment of the present disclosure.

FIG. 3 illustrates a perspective view of a unit cell of the conductive film layer 210 of the shield 200. According to an embodiment of the present disclosure, each hole of the array of holes 218 may have a circular shape. In one embodiment, the hole 218 may have a diameter of about 50 μm, and each unit cell may be about 100 μm$^2$. In other embodiments, the hole and the unit cell may have other smaller or larger dimensions. The holes 218 may be arranged in a square array of rows and columns. In other embodiments, the holes 218 may be arranged in a hexagonal close-packed array to more densely arrange the holes closer together.

In some embodiments, the diameter of each hole 218 is substantially smaller than the wavelength of the RF/microwave radiation in the 100 MHz-100 Ghz range. Thus, by ensuring the size of the holes 218 is smaller than the wavelength of the RF/microwave radiation 204, the conductive film layer 210 is able to block or attenuate the RF/microwave radiation 204. For example, the wavelength of the RF/microwave radiation 204 in the range of 100 MHz to 100 GHz frequencies is 3 m to 300 μm. Thus, a hole 218 having a diameter of about 50 μm is substantially smaller than the wavelength of the waves of which the conductive film layer 210 is configured to block. Accordingly, RF/microwave radiation 204 having frequencies outside of the 100 MHz to GHz range may also be attenuated as long as the diameter of the hole 218 is less than the wavelength of the corresponding RF/microwave radiation 204.

Turning back to FIG. 2, the optical waveguide 212 is made up of a core portion 220 and a cladding portion 216. In some embodiments, the cladding 216 is made of the same material as the core 220 and occupies the space around the core 220, and between the core 220 and the edges of the holes 218 as illustrated. The cladding 216 has a lower refractive index relative to the core 220, and therefore the interior of the core 220 results in total internal reflection to allow the light (e.g., IR or VIS waves) to propagate within the core 220, from the second end 222 the of core 220 to the first end 224 of the core 220. In this manner, as illustrated in FIG. 2, incident optical light 206 may propagate through the core 220 of the optical waveguide 212 from the second end 222 to the first end 224 of the waveguide 212 with negligible to no losses. Furthermore, because the substrate 208 is also transparent, the incident light may be propagated from the source to the electro-optical device 202 that is located at the opposite side of the shield 200.

In some embodiments, the optical waveguide 212 has a conical taper such that the taper angle 216 of the optical waveguide 212 may be about 1.4° relative to an axis 226 normal to the substrate 208. In some embodiments, the taper angle 216 may vary between 1.1° to 1.7° according to various non-limiting examples. As such, an optical waveguide 212 that has a larger taper angle has a first end 224 that is narrower than an optical waveguide 212 that has a smaller taper angle. Moreover, in some embodiments, the tapered optical waveguide 212 is truncated at the first end such that the first end 224 of the optical waveguide 212 is disposed on the substrate 208. That is, the truncated cross-sectional area of the waveguide 212 is coupled to the substrate 208 through the opening in the conductive film layer 210 created by the hole 218. In some embodiments, the optical waveguide 212 may have a height of about 1 mm (e.g., the distance between the first end and the second end 222).

In some embodiments, the optical waveguide 212 may have a pyramid taper instead of the conical taper. The fill factor by the planar optical surface formed by the second ends 222 of the optical waveguide 212 may be improved through the use of a pyramid taper. For example, while a conical tapered optical waveguide 212 results in a fill factor of about 60-70%, a fill factor of about 100% may be achieved by using pyramid taper because the substantially square shaped cross-sectional area of the optical waveguide 212 creates little to no gaps therebetween.

Figures 4A, 4B:
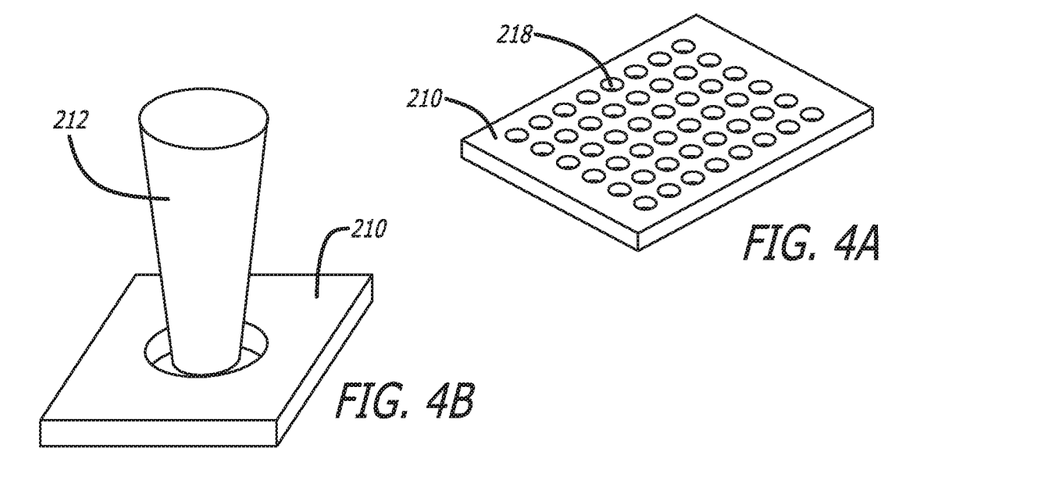
FIG. 4A illustrates a perspective view of an example conductive film layer perforated with an array of circular holes, according to an embodiment of the present disclosure.
FIG. 4B illustrates a close-up perspective view of an example of a unit cell of the conductive film layer that has a circular hole with a truncated conical tapered optical waveguide passing through the hole.

FIG. 4A illustrates a perspective view of a perforated conductive film layer 210 having circular holes 218 that are arranged in rows and columns thus forming a square array pattern, according to various embodiments of the present disclosure. FIG. 4B illustrates an example of a single unit cell of the perforated conductive film layer 210 with an optical waveguide 212 passing through the hole 218. In some embodiments, the diameter of the hole 218 may be slightly larger than the diameter of the core 220 of the optical waveguide 212 and the remaining space between the core 220 and the edge of the hole 218 is occupied by the cladding 216 to provide total internal reflection by the core 220.

Figures 5A, 5B:
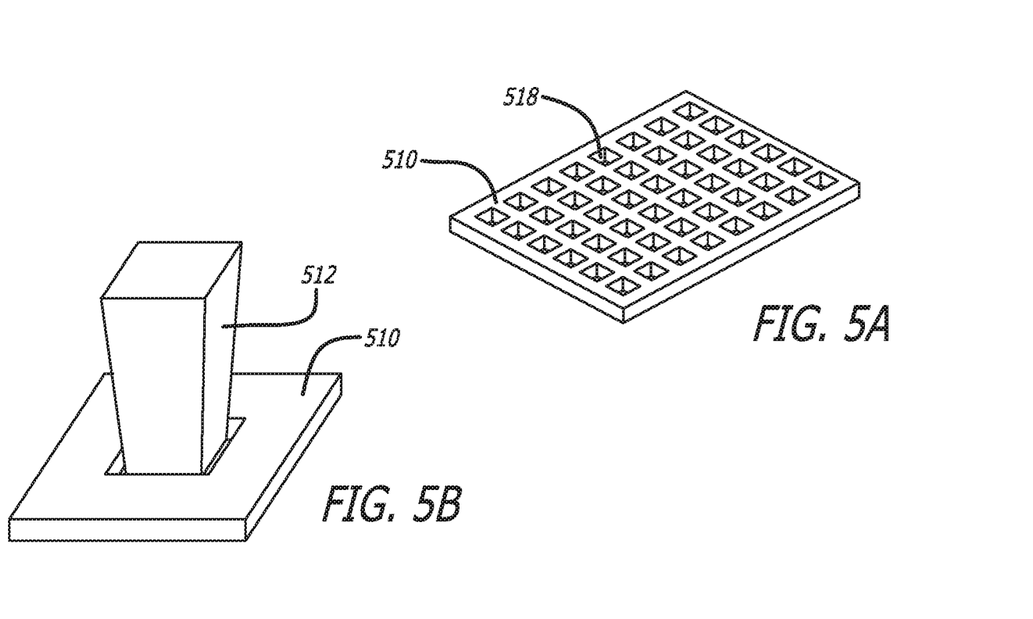
FIG. 5A illustrates a perspective view of an example conductive film layer perforated with an array of square holes, according to an embodiment of the present disclosure.
FIG. 5B illustrates a close-up perspective view of an example of a unit cell of the conductive film layer that has a square hole with a truncated pyramid tapered optical waveguide passing through the hole.

FIG. 5A illustrates a perspective view of a perforated conductive film layer 510 in which the holes 518 are square shaped holes, according to an embodiment of the present disclosure. FIG. 5B illustrates a perspective view of a unit cell of the conductive film layer 510 of FIG. 5A having a square hole 518 and a pyramid tapered optical waveguide 512 passing through the hole 518, according to an embodiment. The length and the width of the square hole 518 may be slightly larger than the respective length and width of the sides of the tapered pyramid optical waveguide 512. The remaining space between the edge of the square hole and the core of the optical waveguide 512 may be filled with cladding of the optical waveguide 512 to provide total internal reflection by the core.

Figure 6:
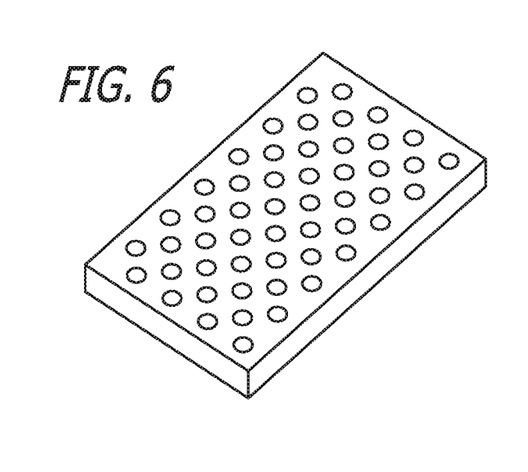
FIG. 6 illustrates a perspective view of an example conductive film layer perforated with an array of circular holes, arranged in a hexagonal pattern, according to an embodiment of the present disclosure.

FIG. 6 illustrates a perspective view of a perforated conductive film layer 610 with circular holes 618 that are arranged in a close packed hexagonal lattice, according to various embodiments of the present disclosure. In this manner, the arrangement of the holes 618 form a hexagonal pattern thus allowing the holes 618 to be packed closer together than the holes 218 that are arranged in rows and columns like in the embodiment illustrated in FIG. 4A. By bundling the optical waveguides 212 more closer together as is the case with the hexagonal lattice pattern increases the fill factor by the planar optical surface formed by the second ends 222 of the optical waveguide 212.

Figure 7A:
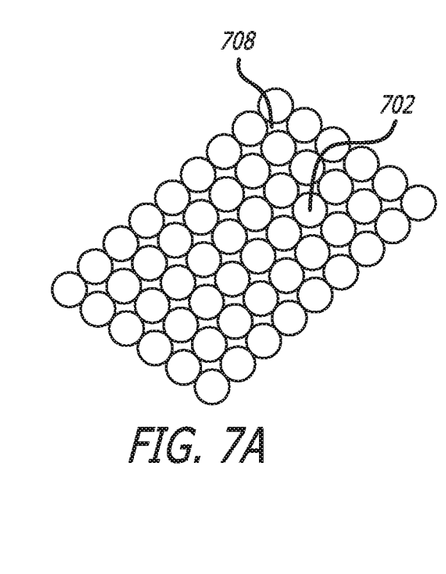
FIGS. 7A-7C illustrate a perspective view of various examples of planar optical surfaces formed by the optical waveguides, according to various embodiments of the present disclosure.
Figure 7B:
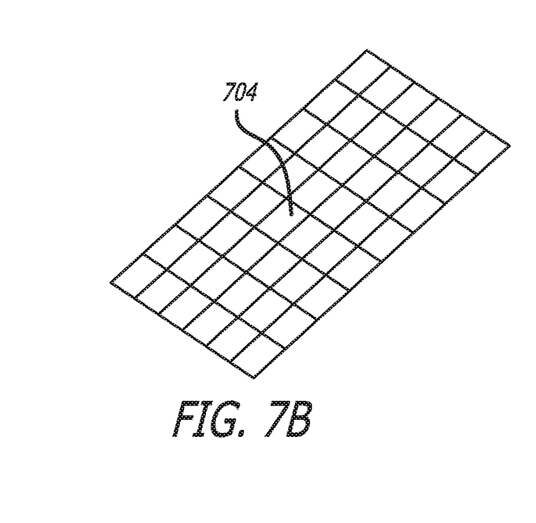
Figure 7C:
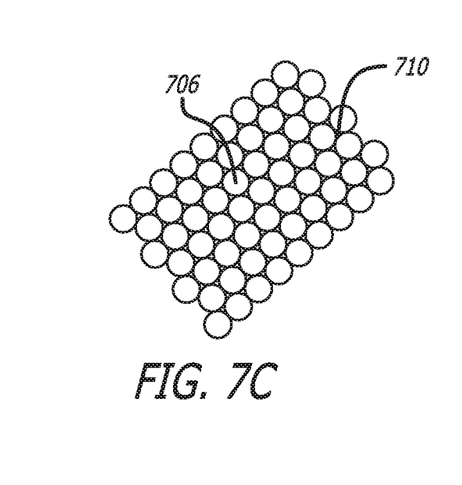

FIGS. 7A-7C illustrate examples of the planar optical surface formed by the second ends of the optical waveguides 212 bundled together, according to various embodiments of the present disclosure. FIG. 7A illustrates the planar optical surface 702 that is formed by the optical waveguides 212 that are disposed on the substrate 208 through the holes 218 arranged in rows and columns as illustrated in FIG. 4A. In this configuration, the fill factor of the surface by the second ends 222 of the optical waveguides 212 is about 60-70% due to the gaps 708 formed between the waveguides. FIG. 7B illustrates the planar optical surface 704 that is formed by the pyramid shaped optical waveguides 512 that are disposed on the substrate 208 through the holes 518 that are arranged in rows and columns, as illustrated in FIG. 5A. In this configuration, the fill factor of the surface by the second ends 222 of the optical waveguides 512 is about 100% because the square cross-section of the optical waveguide 212 nearly covers the entire surface area without leaving any gaps. Accordingly, the shield 200 that uses the pyramid shaped optical waveguides 512 is able to transmit a greater amount of incident light from one side of the shield 200 to the other side.

According to another embodiment, FIG. 7C illustrates the planar optical surface 706 that is formed by the optical waveguides 212 that are disposed on the substrate 208 through the holes that are arranged in the hexagonal pattern as illustrated in FIG. 6. In this configuration, the second ends 222 of the circular shaped optical waveguides 212 can be packed more closely together, thus reducing the area occupied by the gaps 710. Accordingly, a fill factor of up to about 90.7% may be achieved in this configuration.

Figure 8:
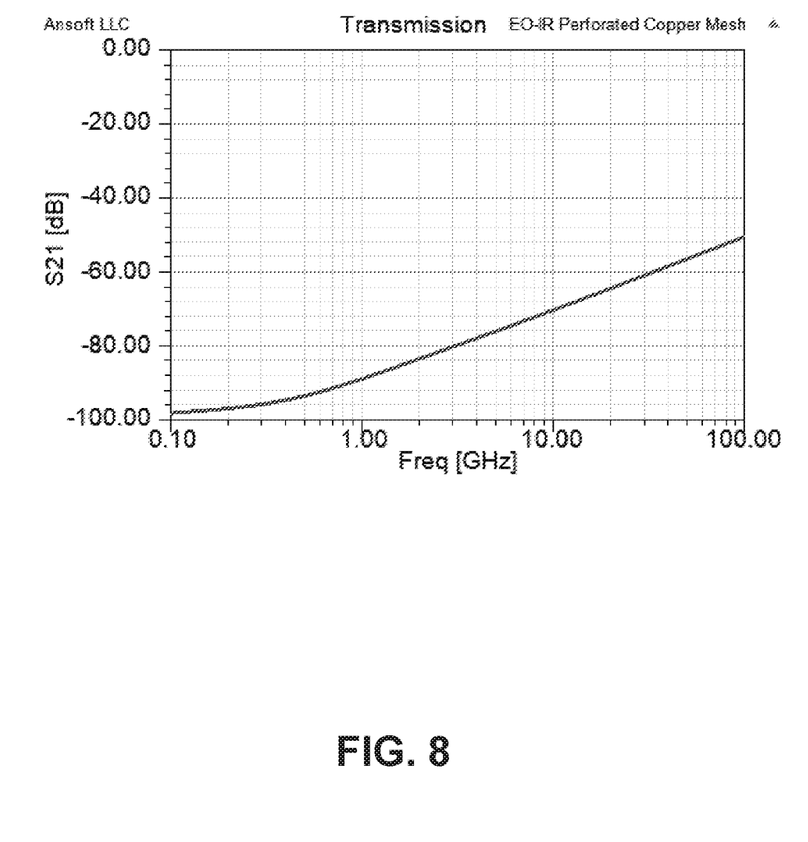
FIG. 8 is a graph that illustrates attenuation levels of RF/microwave electromagnetic radiation at various frequencies, according to embodiments of the present disclosure.

FIG. 8 is a graph that represents attenuation levels of the RF/microwave radiation at various frequencies, e.g., between 0.1 GHz and 100 GHz, using the shield 200 described according to various embodiments of the present disclosure. Thus, in some embodiments, the shield 200 may be configured to attenuate about 100 dB of RF/microwave radiation at 100 MHz, whereas the shield may attenuate about 50 dB of RF/microwave radiation at 100 GHz. The attenuation power of the shield 200 may vary by adjusting various factors, such as for example, changing the diameter or size of the hole, changing the thickness of the film layer, and/or changing the material of the conductive film layer 210.

In some embodiments, it may be desirable to apply the shield 200, described according to the embodiments of the present disclosure, on a window of an aircraft cockpit or on a canopy of a tactical aircraft (e.g., a fighter jet) as illustrated in FIG. 1B. In such case, the shield 200 may be disposed on the window or the canopy, for example, by applying an adhesive on the substrate 208, and coupling the substrate 208 side of the shield 200 on to the exterior side of the window or the canopy. In this manner, the planar optical surface formed by the ends of the optical waveguide 212 may face outward from the cockpit (e.g., facing the exterior of the aircraft) to capture the infrared or visible light from the outside and propagate the captured light from the second end 222 to the first end 224 of the optical waveguide. As such, the aircraft cockpit window or canopy may include a protective shield that is able to attenuate incident RF/microwave electromagnetic radiation from the exterior of the cockpit while allowing the incident infrared or visible light from an exterior of the cockpit to pass through the shield to the cockpit.

Figure 9:
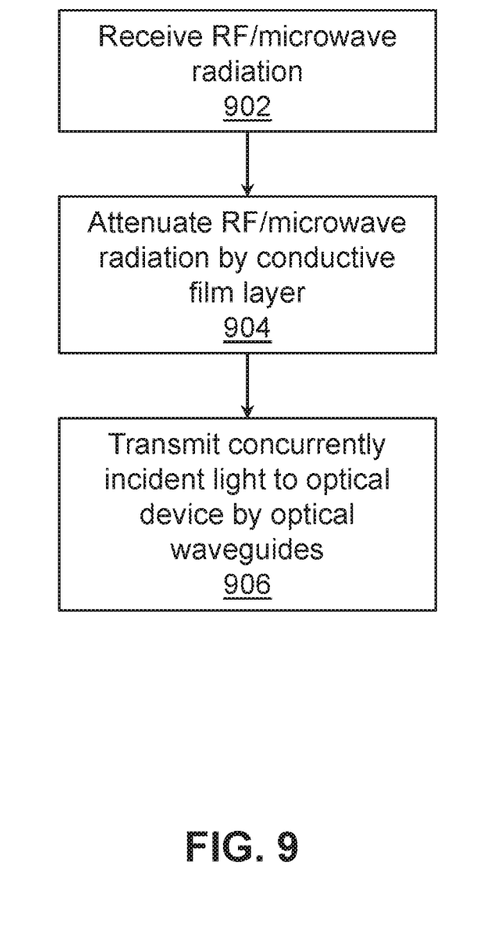
FIG. 9 is a flow chart describing a method for protecting an electro-optical instrument from RF/microwave electromagnetic radiation, according to an embodiment of the present disclosure.

FIG. 9 is a flow chart that describes a method for protecting an electro-optical instrument from an incident RF/microwave radiation, according to an embodiment of the present disclosure. In certain situations, an electro-optical instrument such as an IR or VIS camera may be mounted or disposed in a sensor pod on an aircraft. The sensor pod may be constructed of mostly metallic walls with an opening for the electro-optical instrument to receive the IR or VIS light. In some embodiments, the opening may be covered by a transparent glass or plastic/polymer window to protect the electro-optical instrument from the elements (e.g., rain, dust, etc.). The shield according to various embodiments of the present disclosure may be disposed on the window such that it is in the path of any electromagnetic radiation (e.g., IR or VIS wave, RF/microwave radiation) that is directed toward the electro-optical instrument through the window. Thus, in this configuration, the shield receives the RF/microwave radiation from a source such as a radar antenna (902). The conductive film layer of the shield attenuates the RF/microwave radiation by blocking the RF/microwave radiation and preventing it from penetrating past the shield 200 (904). Meanwhile, the optical waveguides passing through the holes of the conductive film layer are able to propagate the IR or VIS waves from one side of the shield to the other side. Accordingly, the electro-optical instrument may continue to operate and capture the IR or VIS waves from the environment (906).

Figure 10:
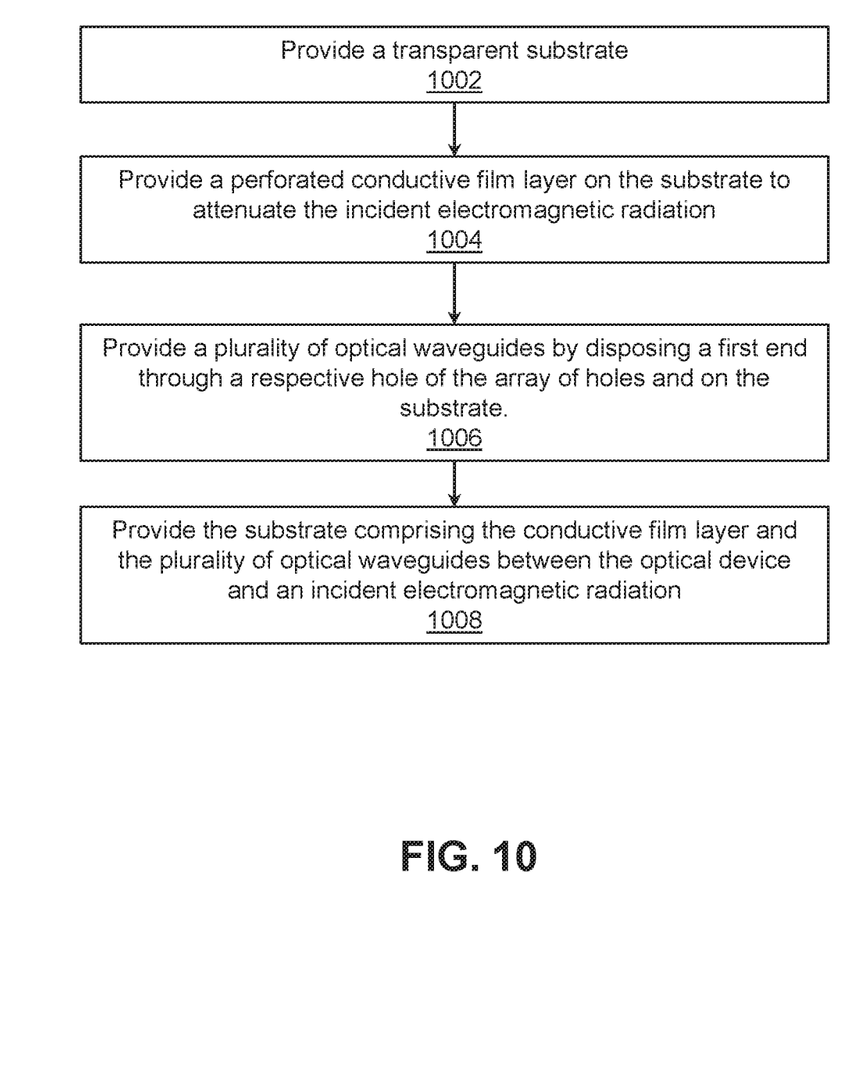
FIG. 10 is a flow chart describing a method for forming an electromagnetically protective shield for an electro-optical instrument, according to an embodiment of the present disclosure.

FIG. 10 is a flow chart that describes a method for forming or manufacturing an electromagnetically protective shield for an optical device, according to an embodiment of the present disclosure. According to a first step, a non-conductive transparent substrate may be provided (1002). By way of example and not of limitation, the substrate may be made of sapphire, zinc selenide, or glass, and serves as a base layer to form the shield. According to an embodiment of the present disclosure, a perforated conductive film layer may be formed on the substrate. The conductive film layer may be perforated with an array of holes to let IR or VIS waves through the shield. The diameter of each one of the holes is substantially smaller than the wavelength of the RF/microwave electromagnetic waves to attenuate the RF/microwave electromagnetic waves thus preventing them from propagating past the conductive layer (1004). A plurality of tapered optical waveguides may be formed substantially vertically on the substrate such that a truncated first end of the optical waveguide is disposed on the substrate and the optical waveguide passes through the holes of the conductive film layer. In some embodiments, at least one optical waveguide is provided through each hole of the array of holes such that the incident light may be captured at one end (e.g., the second end) of the optical waveguide and transmitted via total internal reflection within the core of the waveguide to the other end (e.g., the first end) of the optical waveguide (1006). In some embodiments, the truncated tapered optical waveguides may be fabricated using conventional clean room micro- and nano-fabrication techniques such as, for example, two-photon lithography, self-trapping lithography, and/or angled lithography, as provided in: J. A. Kolodziejska, C. S. Roper, S. S. Yang, W. B. Carter, and A. J. Jacobsen, "Research Update: Enabling ultra-thin lightweight structures: Microsandwich structures with microlattice cores," APL Mater. 3, 050701 (2015); Ian D. Hosein, Hao Lin, Matthew R. Ponte, Dinesh K. Basker, Michael A. Brook, and Kalaichelvi Saravanamuttu, "Waveguide Encoded Lattices (WELs): Slim Polymer Films with Panoramic Fields of View (FOV) and Multiple Imaging Functionality," Adv. Funct. Mater. 2017, 1702242; and U.S. Pat. No. 9,910,200, all of which are incorporated herein by reference in their entirety.

In some embodiments, the shield, including the substrate, the conductive film layer, and the plurality of optical waveguides may be provided between the electro-optical instrument and the incident RF/microwave electromagnetic radiation (1008). For example, the shield may be applied using certain types of adhesive material to the window of the sensor pod or the cockpit glass of an aircraft. Accordingly, an electromagnetically protective shield may be fabricated and applied on a window of a sensor pod or a canopy of an aircraft to protect electro-optical instruments from EMI while maintaining optical transparency to IR or VIS waves.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A device, comprising:
   a transparent substrate;
   a conductive film layer on the substrate, wherein the film layer is perforated with an array of holes and configured to attenuate RF/microwave electromagnetic radiation; and
   a plurality of optical waveguides, each optical waveguide having a first end and a second end, wherein the first end of each optical waveguide is disposed over the substrate and passes through a respective hole of the array of holes such that each hole comprises at least one optical waveguide,
   wherein the optical waveguide is configured to capture incident light from the second end and guide the incident light to the first end through the hole, and
   wherein the second ends of the plurality of optical waveguides are adjacent and abut each other to form a planar optical surface.

2. The device of claim 1, wherein the planar optical surface forms a light capturing surface, configured to capture the incident light and guide the light to the first end.

3. The device of claim 1, wherein the array of holes is arranged in one of a lattice pattern, a rectangular pattern, or a hexagonal pattern.

4. The device of claim 1, wherein the optical waveguide is a conical taper such that a diameter of the second end of the optical waveguide is larger than a diameter of the first end of the optical waveguide, and the first end of the optical waveguide is a truncated conical taper.

5. The device of claim 1, wherein the hole is a square hole and the optical waveguide is a pyramid taper such that a width of the second end of the optical waveguide is larger than a width of the first end of the optical waveguide, and the first end of the optical waveguide is a truncated pyramid taper.

6. The device of claim 1, wherein a diameter of each of the holes is smaller than a wavelength of the RF/microwave electromagnetic radiation.

7. The device of claim 1, wherein the plurality of optical waveguides comprise micro-optical structures fabricated by lithography.

8. The device of claim 1, wherein the conductive film layer is a conductive material selected from the group consisting of: copper, gold, silver, and aluminum, and fabricated using lithography, sputtering, and electroplating.

9. An electro-optical instrument comprising a protective shield comprising the device of claim 1, configured to attenuate RF/microwave electromagnetic radiation and concurrently transmit incident visible or infrared light.

10. The instrument of claim 9, wherein the instrument is a visible or infrared light camera.

11. An aircraft cockpit window comprising a protective shield comprising the device of claim 1, configured to attenuate RF/microwave electromagnetic radiation from an exterior of the cockpit and concurrently transmit incident optical light from the exterior of the cockpit to an interior of the cockpit.

12. A method for protecting an optical device from an incident RF/microwave electromagnetic radiation using the device of claim 1, the method comprising:
receiving the incident RF/microwave electromagnetic radiation;
attenuating the RF/microwave electromagnetic radiation using a conductive thin film layer; and
transmitting concurrently, the incident light to the optical device.

13. A method for forming an electromagnetically protective shield for an optical device, the method comprising:
providing a transparent substrate;
providing a conductive film layer on the substrate, wherein the film layer is perforated with an array of holes and configured to attenuate incident RF/microwave electromagnetic radiation; and
providing a plurality of optical waveguides, each optical waveguide having a first end and a second end, wherein the first end of each optical waveguide is disposed over the substrate and passes through a respective hole of the array of holes such that each hole comprises at least one optical waveguide,
wherein the optical waveguide is configured to capture incident light from the second end and guide the incident light to the first end through the hole, and
wherein the second ends of the plurality of optical waveguides are adjacent and abut each other to form a planar optical surface.

14. The device of claim 1, wherein the waveguides of the plurality of optical waveguides are bundled together to form the planar optical surface at the second end of the waveguides.

15. The method of claim 13, further comprising providing the substrate comprising the conductive film layer and the plurality of optical waveguides between the optical device and an incident RF/microwave electromagnetic radiation.

16. The method of claim 13, wherein the optical waveguides of the plurality of optical waveguides are bundled together to form the planar optical surface at the second end of the optical waveguides.

17. The method of claim 13, wherein the optical waveguide is a conical taper such that a diameter of the second end of the optical waveguide is larger than a diameter of the first end of the optical waveguide, and the first end of the optical waveguide is a truncated conical taper.

18. The method of claim 13, wherein the hole is a square hole and the optical waveguide is a pyramid taper such that a width of the second end of the optical waveguide is larger than a width of the first end of the optical waveguide, and the first end of the optical waveguide is a truncated pyramid taper.

19. The method of claim 13, wherein a diameter of each of the array of holes is smaller than a wavelength of the RF/microwave electromagnetic radiation.

20. The method of claim 13, wherein the plurality of optical waveguides comprise micro-optical structures fabricated by lithography.

* * * * *